United States Patent [19]

Cowles et al.

[11] 4,203,325
[45] May 20, 1980

[54] LIQUID LEVEL SENSING APPARATUS

[75] Inventors: Arthur L. Cowles, River Falls; Thomas C. Ensign, Hudson Township, St. Croix County, Wis.

[73] Assignee: Minnesota Mining and Manufacturing Company, St. Paul, Minn.

[21] Appl. No.: 890,672

[22] Filed: Mar. 27, 1978

[51] Int. Cl.² ............................................. G01F 23/26
[52] U.S. Cl. ................................................. 73/304 R
[58] Field of Search ................ 73/304 R; 137/392; 340/612, 618, 620; 364/509; 200/190

[56] References Cited

U.S. PATENT DOCUMENTS

| | | | |
|---|---|---|---|
| 3,653,017 | 3/1972 | Parkes | 340/620 |
| 3,741,683 | 6/1973 | McTamaney et al. | 137/392 X |
| 3,911,744 | 10/1975 | Edwards | 73/304 R |
| 3,967,238 | 6/1976 | Ridpath et al. | 340/620 |

FOREIGN PATENT DOCUMENTS 473,057  8/1975  U.S.S.R. .............................. 73/304 R

Primary Examiner—Jerry W. Myracle
Attorney, Agent, or Firm—Cruzan Alexander; Donald M. Sell; Robert L. Marben

[57] ABSTRACT

A liquid level sensing electrode structure provided by flat cable which has a plurality of insulated conductors cut to various lengths with end portions exposed to provide sensing electrodes is used in a liquid level sensing system. A common electrode is provided for the system. A separate voltage inverter is provided for each sensing electrode and connects with a voltage source to provide a microprocessor compatible signal when liquid is presented to the common electrode and the sensor for the inverter. A liquid utilization apparatus having a liquid sensing system provides a flow of liquid along the electrode structure to prevent sediment buildup.

11 Claims, 4 Drawing Figures

LIQUID LEVEL SENSING APPARATUS

BACKGROUND OF THE INVENTION

1. Field of the Invention

The invention presented herein relates to liquid level sensing systems utilizing sensing electrodes positioned at various levels for contacting the liquid to connect the liquid as a part of electronic circuitry which provides electrical signals indicative of the sensed liquid level.

2. Brief Description of the Prior Art

U.S. Pat. No. 3,911,744 discloses a liquid level sensing arrangement wherein single sensing electrodes spaced a short distance from a common electrode are positioned at a multiplicity of levels at which it is desired that liquid levels be detected. The sensing electrodes and the common electrode are positioned within an open-ended probe unit that is inserted into the liquid storage container. A single multiconductor sheathed cable is used to connect each electrode to a separate fixed contact of a multiple position selector switch having a movable contact that is connected to a voltage source. Each fixed contact has a resistor which connects the contact to one input of a circuit for driving a light emitting diode. The other input for the circuit is connected to the common electrode for the sensing electrodes. When the liquid is present at a sensing electrode to which the selector switch is selectively connected, the light emitting diode is energized. The circuit for driving the light emitting diode utilizes an analog amplifier as an active input component which is also used to drive a meter used to provide an accurate indication of the liquid level.

Such prior art liquid sensing arrangement is not suitable for use in measuring levels for liquids containing materials which may cause a buildup of sediment at the electrodes. Sediment buildup may be a problem in clothes washers, for example. In addition, the connections that must be made to the separate sensing electrodes and corresponding switch connectors by the use of a multiconductor sheathed cable is not cost effective with respect to materials and the level of care and skill required to make proper connections. Further, positioning of the various electrodes as shown in the prior patents is unduly complicated.

Microprocessors are currently being utilized for controlling the operation of various types of apparatus making it desirable that a liquid level sensing system provide signals that are directly compatible with microprocessor requirements. In the case of the above-mentioned prior art system, the initial active input component is an analog device and, therefore, provides an output which is not directly compatible with microprocessor requirements.

SUMMARY OF THE INVENTION

The various shortcomings mentioned with respect to the prior art liquid level sensing systems are eliminated by the present invention wherein a plurality of sensing electrodes are provided by a flat multiconductor cable having a plurality of conductors terminated at various desired lengths with an end portion of each terminated conductor exposed. A common ground electrode is spaced from the exposed portions and each of the conductors for the sensing electrodes connect to the input of a separate voltage inverter for each sensing electrode and to a voltage source via a separate resistor for each sensing electrode. The sensing electrode cable is positioned in a container to which liquid is to be presented. Each voltage inverter provides a microprocessor compatible signal when the circuit between its sensing electrode and the ground electrode is completed by liquid present in the container. It is desirable for many applications that the insulation material for the cable be hydrophobic.

When used in combination with a liquid utilization apparatus to provide liquid level sensing, the liquid level sensing system of this invention is positioned so a portion of fill liquid for the apparatus is directed to an upper end portion of the flat cable allowing it to run down the cable serving to keep the sensing electrodes free of sediment buildup. It is desirable in such situations to use an insulation material for the cable that has an affinity for the liquid being utilized.

DETAILED DESCRIPTION

Figure 1:
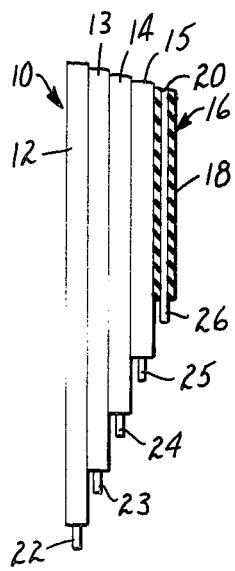
FIG. 1 is a plan view of a portion of a sensing electrode structure according to the present invention with a portion shown in cross-section.
Figure 2:
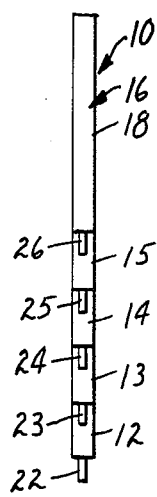
FIG. 2 is a side view of the sensing electrode structure of FIG. 1.

Referring to FIG. 1, a multiple sensing electrode structure 10 is illustrated which is formed from commercially available flat multiconductor cable. The structure 10 includes a number of insulated conductors 12-16, which are positioned parallel to one another with the adjacent conductors physically joined together by the same insulating material which surrounds each conductor. To illustrate the structure for the insulated conductors, the insulated conductor 16 is shown in cross-section and includes the insulating material 18 which surrounds the conducting member 20. Once the levels that are sought to be detected are determined, the various conductors of a piece of flat cable are terminated at lengths corresponding to the desired detection levels. The structure, as illustrated in FIG. 1, would provide liquid detection at equally spaced intervals. After the conductors are terminated, a portion of the insulation for each conductor is removed to provide the five sensing electrodes 22-26 shown in the structure of FIG. 1. FIG. 2, which is a side view of the electrode structure 10 of FIG. 1, serves to illustrate the flat nature of the electrode structure 10. Flat cable having sufficient rigidity permits a sensing electrode structure, such as that shown in FIGS. 1 and 2, to be readily positioned vertically in a container for which liquid levels are to be sensed.

Figure 3:
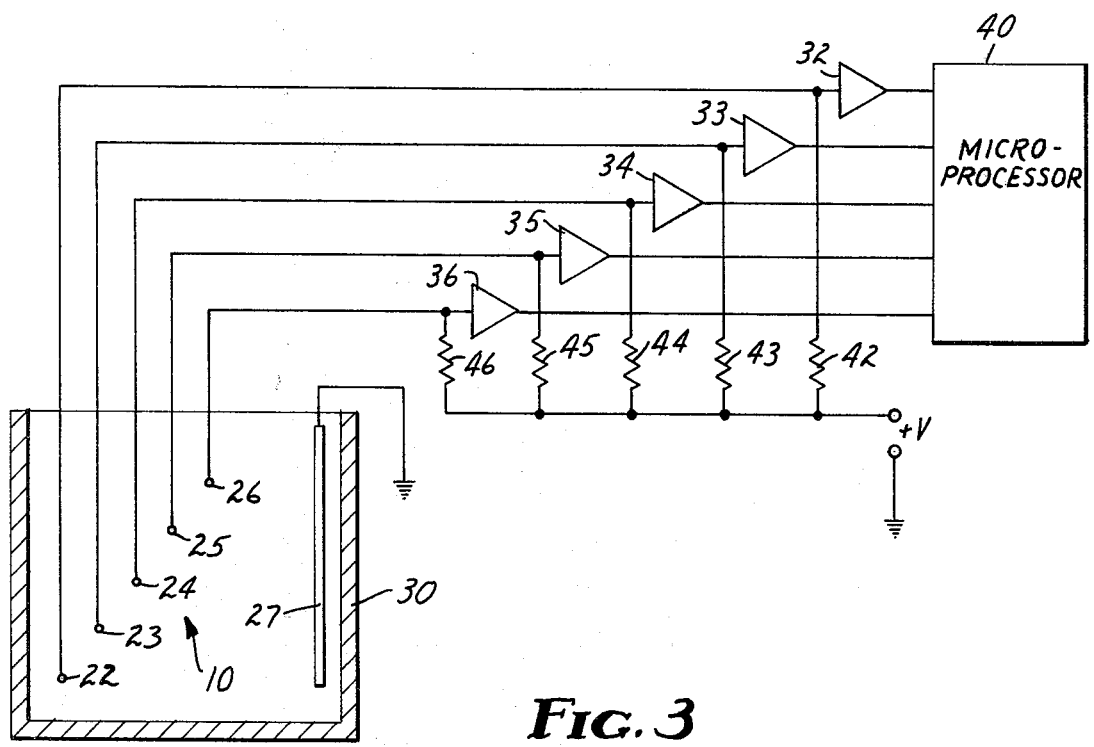
FIG. 3 is a diagrammatic representation of the liquid level sensing system embodying the present invention.

FIG. 3 is a diagrammatic representation of a liquid sensing system utilizing the sensing electrode structure 10 of FIGS. 1 and 2. In FIG. 3, the sensing electrode structure 10 is disposed vertically in a container 30 in which liquid levels are to be sensed. The sensing electrode 10 is diagrammatically shown with the various sensing electrodes 22-26, indicated in FIG. 3 by small dots, which are connected by the conductors provided by the flat cable to an input of inverters 32-36, respectively, and to one end of resistors 42-46, respectively.

The other ends of resistors 42-46 are connected to a source of D.C. voltage, +V. The output of the inverters 32-36 are shown connected to a microprocessor 40 to illustrate the utilization of the outputs provided from the inverters 32-36. A common electrode 27 for the sensing electrodes 22-26 is also positioned vertically in the container 30 and extends for a distance that is somewhat the same as the vertical distance through which the sensing electrodes 22-26 extend. The electrode 27 is spaced from the sensing electrode structure 10 and, though no indicated by FIG. 3, is usually oriented with respect to the flat surface of the flat cable providing the structure 10 so as to be about the same distance from each sensing electrode. The common electrode 27 is connected to ground.

The inverters 32-36 may, for example, be provided by the type CD4069BE COS/MOS inverter available from the RCA Corporation. The resistors 42-46 are selected to present a resistance that is sufficiently large so that liquid presented between a given sensing electrode and the common electrode will cause the voltage at the input of the associated inverter to be reduced to a level sufficient to assure switching of the inverter. It is desirable that the highest feasible resistance be presented by the resistors 42-46 to minimize electrolysis.

When liquid is introduced into the container 30, a new separate circuit from the D.C. voltage source, +V, to ground is complete each time the liquid level reaches one of the sensing electrodes 22-26. For example, liquid presented between sensing electrode 22 and the common electrode 27 completes the series circuit which includes the D.C. voltage source, +V, resistor 42, sensing electrode 22, the liquid in container 30, and the common electrode 27 to ground. Prior to the completion of this circuit, the full D.C. voltage, +V, is presented to the input of inverter 32. The output of the inverter 32 is then at ground potential. Upon completion of the circuit described by the introduction of liquid between the sensing electrode 22 and the common electrode 27, the voltage at the input of inverter 32 is essentially at ground potential, since the resistance presented by the liquid is substantially less than the resistance presented by resistor 42. With the input of inverter 32 essentially at ground potential, the output of the inverter 22 is at the level of the D.C. voltage source, +V. Accordingly, each of the inverters 32-36 present either a ground potential or a D.C. voltage source, +V, signal to the microprocessor 40 dependent on whether the level of the liquid introduced into the container 30 has reached the sensing electrode for the inverter.

The output signals of the inverters 22-26 are compatible with the input signal requirement for the microprocessor 40 connected to the outputs of inverters 32-36. With this arrangement, the microprocessor 40 can be used in a control system to control various functions in accordance with the liquid levels that are detected.

It is desirable, except for the type of system to be described in connection with FIG. 4, that a hydrophobic insulating material or coating be used for the conductors of the flat cable used to provide the sensing electrodes 22-26. By using a hydrophobic insulating material or coating for the electrode structure 10, the problem of sediment buildup is minimized making it possible to utilize the electrode structure 10 in a level sensing system where it is not practical to remove the electrode structure 10 for cleaning or to rinse it during filling or emptying. In addition, the use of a hydrophobic material provides more reliable level detection when the liquid level is receding, since adherence of the liquid to the electrode structure 10 is minimized.

A liquid level sensing system of the type described in connection with FIGS. 1-3 provides a structure which can be of particular value for providing an all electronic liquid level sensing system for liquid utilization apparatus where a sediment buildup problem with respect to the sensing electrodes must be overcome. Liquid utilization apparatus such as dishwashers and clothes washers, for example, present a sediment buildup problem.

Figure 4:
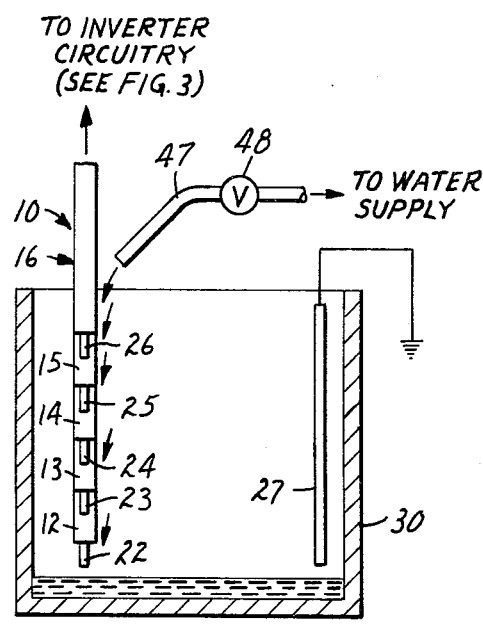
FIG. 4 is a side view of the sensing electrode structure of FIG. 1 diagrammatically shown positioned for sensing the liquid level for a liquid utilization apparatus.

Referring to FIG. 4, a liquid utilization apparatus including a container 30 is shown in which the multiple sensing electrode structure of FIG. 1 is positioned vertically along with the common electrode 27, as described in connection with FIG. 3. The electrode structure 10 is oriented so the various electrodes 22-26 are substantially the same distance from the common electrode 27. The connection of the various sensing electrodes 22-26 to inverter circuits is the same as shown in FIG. 3. To the extent described at this point, the arrangement of FIG. 4 is essentially in accordance with the arrangement shown in FIG. 3.

In order that a sediment buildup problem can be avoided, a portion of fill liquid for the liquid utilization apparatus is directed to the upper portion of the sensing electrode structure 10 at the time liquid is supplied to the apparatus. Structure for accomplishing this is illustrated by the liquid conduit 47, which has its outlet positioned near the upper end portion of the sensing electrode structure 10, with its inlet connected to the liquid supply for the apparatus. A valve 48 is shown which controls the liquid flow. The liquid conduit 47 may also be connected to the liquid supply for the liquid utilization apparatus without using the valve 48. It is desirable in this case that the insulating material for the conductors 12-16 of structure 10 or a coating for the insulating material be selected to have an affinity for the liquid used. Where water is used as the liquid, a hydrophilic insulating material or coating is desirable. While it is desirable that resistors 42-46 present the highest feasible resistance to prevent electrolysis, it is desirable that the resistance of resistors 42-46 for the system of FIG. 4 be established at a minimum magnitude so the current paths established by the liquid flowing over the sensing electrode structure 10 will not effect the proper operation of the system. It is desirable also that the common electrode 27 be separated from the sensing electrodes 22-26 at a distance sufficient to prevent liquid flow from bridging the space between the sensing electrodes and the common electrode and to prevent splashing of the liquid from presenting a bridging problem.

While specific embodiments of this invention have been shown and described, further modifications and improvements will occur to those skilled in the art. It is to be understood, therefore, that this invention is not limited to the particular form shown, and it is intended that the appended claims cover all modifications which do not depart from the spirit and scope of this invention.

What is claimed is:

1. A liquid level multiple sensing electrode structure including a flat cable having a plurality of conductors terminated at various lengths at one end of said cable, said conductors having insulation extending the length of each conductor, except for a short terminating end portion of each conductor at said one end of said cable wherein each terminating end portion provides a sensing electrode and wherein the outer surface of said insulation is hydrophilic.

2. A liquid level sensing system comprising:
a vertically disposed flat cable having a plurality of conductors terminated at various lengths at the lower end of said cable, said conductors having insulation extending the length of each conductor, except for a short terminating end portion of each conductor at said lower end of said cable, said end portions providing contact with the liquid to be sensed at a plurality of levels;
a common electrode for providing contact with the liquid to be sensed and positioned in proximity to said end portions;
a plurality of energizing voltage connecting resistors; and
a separate voltage inverter for each of said conductors, said inverter having an input electrically connected directly to one end of a different one of said resistors and to a different one of said conductors, said inverter providing an output signal when said end portion of said conductor connected to said input of said inverter and said common electrode are contacted by liquid at the level of said last-mentioned end portion.

3. A liquid level sensing system comprising:
a vertically disposed flat cable having a plurality of conductors terminated at various lengths at the lower end of said cable, said conductors having insulation extending the length of each conductor, except for a short terminating end portion at the lower end of each conductor, said end portions providing contact with the liquid to be sensed at a plurality of levels;
a common electrode for providing contact with the liquid to be sensed and positioned in proximity to said end portions;
a plurality of energizing voltage connecting resistors;
a plurality of series circuit portions, one for each of said conductors, each of said circuit portions including a different one of said resistors having one end connected to a different one of said conductors; and
an inverter, one for each of said circuit portions, having an input connected directly to a different one of said circuit portions at said one end of said resistor for one of said circuit portions, said inverter for a given one of said circuit portions providing an output signal when said end portion of said conductor for said given one of said circuit portions and said common electrode are contacted by liquid at the level of said last-mentioned end portion.

4. A liquid level sensing system in accordance with claims 2 or 3 wherein said output signal is compatible with microprocessors.

5. A liquid level sensing system in accordance with claims 2 or 3 wherein the outer surface of said insulation is hydrophilic.

6. A liquid level sensing system in accordance with claims 2 or 3 wherein the outer surface of said insulation is hydrophobic.

7. A liquid utilization apparatus including:
a liquid receiving container;
a liquid level sensing system including a multiple liquid level sensing electrode structure including a flat cable vertically disposed in said container, said cable having a plurality of conductors terminated at various lengths at the lower end of said cable, said conductors having insulation extending the length of each conductor, except for a short terminating end portion of each conductor at said lower end of said cable wherein each terminating end portion provides a sensing electrode, the outer surface of said insulation having an affinity for the liquid to be sensed; and
a liquid conduit disposed for directing liquid to the upper end portion of said cable allowing liquid from said conduit to flow along said cable and in contact with said terminating end portions.

8. A liquid utilization apparatus including:
a liquid receiving container which is a water receiving container;
a liquid level sensing system including a multiple liquid level sensing electrode structure including a flat cable vertically disposed in said container, said cable having a plurality of conductors terminated at various lengths at the lower end of said cable, said conductors having insulation extending the length of each conductor, except for a short terminating end portion of each conductor at said lower end of said cable wherein each terminating end portion provides a sensing electrode, the outer surface of said insulation being hydrophilic; and
a liquid conduit disposed for directing liquid to the upper end portion of said cable allowing liquid from said conduit to flow along said cable and in contact with said terminating end portions.

9. A liquid utilization apparatus including:
a liquid receiving container;
a liquid level sensing system including a multiple liquid level sensing electrode structure including a flat cable vertically disposed in said container, said cable having a plurality of conductors terminated at various lengths at the lower end of said cable, said conductors having insulation extending the length of each conductor, except for a short terminating end portion of each conductor at said lower end of said cable wherein each terminating end portion provides a sensing electrode; and a common electrode positioned in said container for contacting the liquid to be sensed and positioned in proximity to said end portions, but at a distance sufficient to prevent bridging between any of said end portions and said common electrode by liquid when flowing along said cable; and
a liquid conduit disposed for directing liquid to the upper end portion of said cable allowing liquid from said conduit to flow along said cable and in contact with said terminating end portions.

10. A liquid utilization apparatus in accordance with claim 9 wherein said liquid level sensing system includes:
a plurality of energizing voltage connecting resistors;
a plurality of series circuit portions, one for each of said conductors, each of said circuit portions including a different one of said resistors having one end connected to a different one of said conductors; and
an inverter, one for each of said circuit portions, having an input connected to a different one of said circuit portions at said one end of said resistor for one of said circuit portions, said inverter for a given one of said circuit portions providing an output signal when said end portion of said conductor for said given one of said circuit portions and said common electrode are contacted by liquid at the level of said last-mentioned end portion.

11. A liquid utilization apparatus in accordance with claim 10 wherein said output signal is compatible with microprocessors.

* * * * *